(12) United States Patent
Bauer

(10) Patent No.: US 12,498,400 B2
(45) Date of Patent: Dec. 16, 2025

(54) METHOD OF ESTIMATING A VOLTAGE

(71) Applicant: Alberto Bauer, Dubai (AE)

(72) Inventor: Alberto Bauer, Dubai (AE)

( * ) Notice: Subject to any disclaimer, the term of this patent is extended or adjusted under 35 U.S.C. 154(b) by 23 days.

(21) Appl. No.: 18/754,369

(22) Filed: Jun. 26, 2024

(65) Prior Publication Data
US 2024/0353450 A1    Oct. 24, 2024

(51) Int. Cl.
*G01R 15/06*    (2006.01)
*G01R 19/00*    (2006.01)

(52) U.S. Cl.
CPC ......... *G01R 15/06* (2013.01); *G01R 19/0084* (2013.01)

(58) Field of Classification Search
CPC ........ G01R 15/00; G01R 15/04; G01R 15/06; G01R 19/00; G01R 19/0084; G01R 19/0092
USPC ...................................... 324/76.11
See application file for complete search history.

(56) References Cited

U.S. PATENT DOCUMENTS

| | | | |
|---|---|---|---|
| 10,379,142 B2* | 8/2019 | Magerl | H02M 3/335 |
| 2014/0159701 A1 | 6/2014 | Nabielec | |
| 2015/0108990 A1* | 4/2015 | Coenen | G01R 31/54 |
| | | | 324/426 |
| 2016/0069937 A1 | 3/2016 | Johnson | |
| 2018/0143234 A1 | 5/2018 | Saxby | |

FOREIGN PATENT DOCUMENTS

| | | |
|---|---|---|
| DE | 102010052346 A | 5/2012 |
| GB | 2007048 A | 5/1978 |

OTHER PUBLICATIONS

Physics Libre Texts, 8.3: Capacitors in Series and in Parallel; https://phys.libretexts.org/Bookshelves/University_Physics/University_Physics_(OpenStax)/University_Physics_II_-_Thermodynamics_Electricity_and_Magnetism_(OpenStax)/08%3A_Capacitance/8.03%3A_Capacitors_in_Series_and_in_Parallel.*

* cited by examiner

*Primary Examiner* — Hoai-An D. Nguyen
(74) *Attorney, Agent, or Firm* — Andrew Wilford

(57) ABSTRACT

Method for estimating the voltage value relating to a live element uses five capacitors, wherein a first capacitor has its first pole connected to said live element; a second capacitor has its first pole connected to said live element; a third capacitor has its first pole connected to the second pole of the first capacitor and its second pole connected to ground; a fourth capacitor has its first pole connected to the second pole of the second capacitor and its second pole connected to the first pole of a fifth capacitor. The voltage value is estimated using: 1) a voltage value relating to a first node positioned along the conducting wire that connects the first capacitor to the third capacitor 2) a voltage value relating to a second node positioned along the conducting wire that connects the fourth capacitor to the fifth capacitor; 3) a capacitance value of the third capacitor; 4) a capacitance value of the fourth capacitor; 5) a capacitance value of the fifth capacitor.

12 Claims, 3 Drawing Sheets

METHOD OF ESTIMATING A VOLTAGE

CROSS REFERENCE TO RELATED APPLICATIONS

This application is the US-national stage of PCT application PCT/IT2023/000010 filed 13 Apr. 2023 and claiming the priority of Italian patent application 10 2022 000007430 itself filed 15 Apr. 2022.

FIELD OF INVENTION

The present invention regards to the sector of Methods for estimating the value of the electric voltage of a live element.

More particularly, the present invention relates to a Method for estimating the voltage of a live element, in which, for example, said live element can be a conductor, or a bar, or a bushing, or other live element.

BACKGROUND OF THE INVENTION

Methods are currently known for estimating the value of the electric voltage of a live element.

Said known methods have a series of drawbacks.

A first drawback is due to the fact that they do not allow a correct and/or safe estimate of the voltage value of the live element to be maintained over time, due to the aging of the electrical components and/or other reasons.

A second drawback is due to the fact that they require maintenance which is difficult and expensive in relation to the components of the relative system in order to maintain a given measurement precision over time.

A third drawback is due to the fact that they require maintenance and/or repair operations for the related systems which can be performed only if the live element being measured is not live.

A fourth drawback is due to the fact that the maintenance and/or repair operations of said systems can be performed only and exclusively by expert workers.

OBJECT OF THE INVENTION

The object of the present invention is therefore to solve the aforementioned drawbacks.

The invention, which is characterized by the claims, solves the problem of creating a method for estimating the value of the electric voltage relating to a live element of a system comprising: a first capacitor comprising a respective first pole and a second pole; a second capacitor comprising a respective first pole and a second pole; a third capacitor comprising a respective first pole and a second pole; a fourth capacitor comprising a respective first pole and a second pole; a fifth capacitor comprising a respective first pole and a second pole: wherein said first capacitor has its first pole connected to said live element; wherein said second capacitor has its first pole connected to said live element; wherein said third capacitor has its first pole connected to the second pole of the first capacitor and its second pole connected to ground; wherein said fourth capacitor has its first pole connected to the second pole of the second capacitor and its second pole connected to the first pole of the fifth capacitor; wherein said fifth capacitor has its second pole connected to ground; wherein said first capacitor supplies on its second pole and/or along the respective conducting wire which connects it to the third capacitor a voltage value defined herein as first voltage value; wherein said fourth capacitor supplies on its second pole and/or along the respective conducting wire which connects it to the fifth capacitor, a voltage value defined herein as fourth voltage value; wherein said method is characterized by the fact that the estimation of the voltage value of the element under voltage comprises the following operations: A)_Measuring at least one voltage value relating to a first point/node positioned along the conducting wire which connects the first capacitor to the third capacitor; B)_Detect at least one voltage value relating to a second point/node positioned along the conducting wire that connects the fourth capacitor to the fifth capacitor; C)_Execute the estimate using the following values: 1)_the value of the voltage relating to the first point/node detected by above point A); 2)_the value of the voltage relating to the second point/node detected by above point B); 3)_at least one capacitance value of the third capacitor; 4)_at least one capacitance value of the fourth capacitor; 5)_at least one capacitance value of the fifth capacitor.

BRIEF DESCRIPTION OF THE DRAWINGS

Further characteristics and advantages of the present invention will be more evident from the following description of some of its preferred practical embodiments, given here by way of purely non-limiting example, made with reference to the figures of the attached drawings in which.

PREFERRED EXAMPLE FORMS OF IMPLEMENTATION PRACTICES

Figure 1:
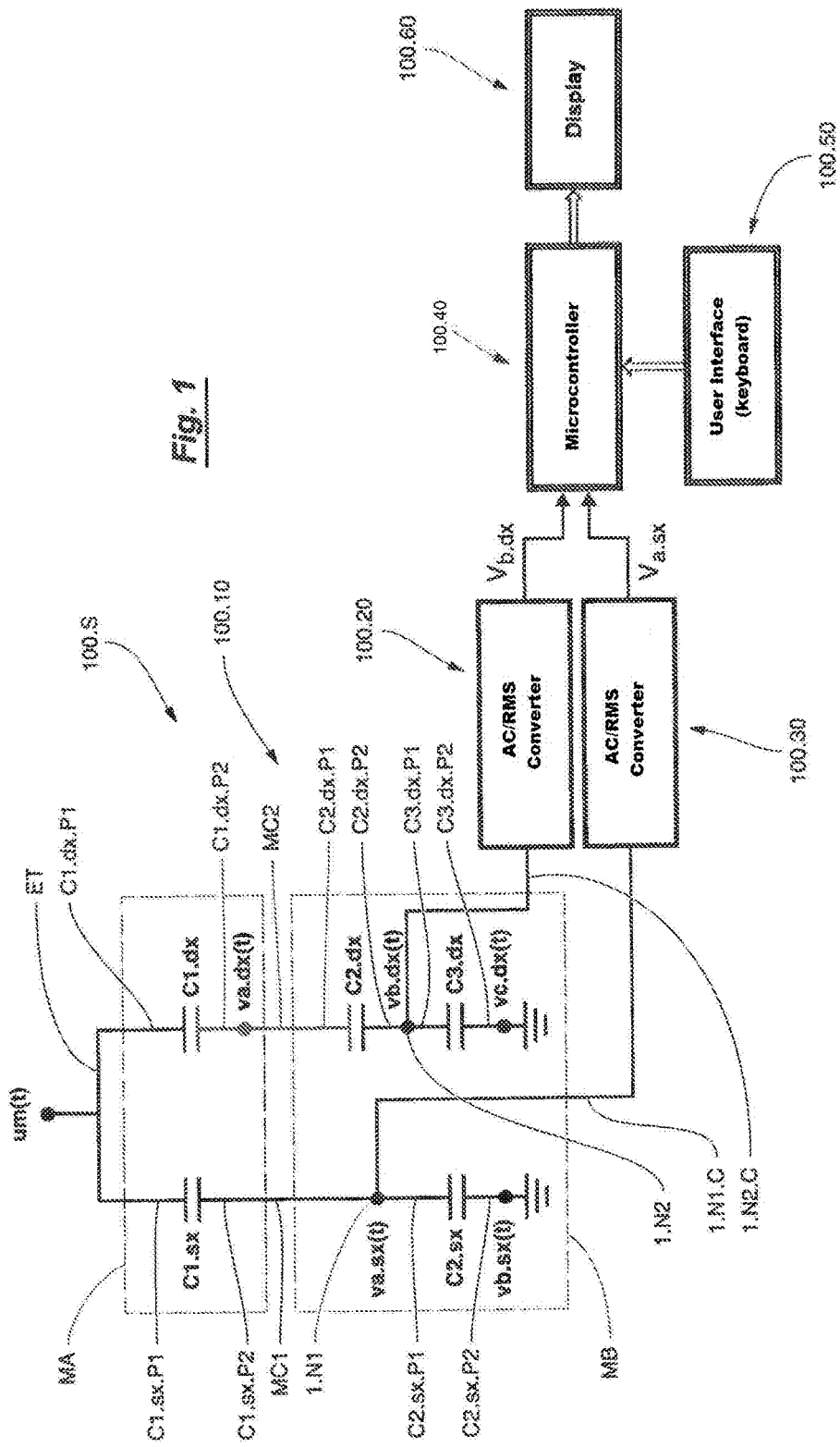
FIG. 1 illustrates a first embodiment of the method object of the present invention.
Figure 2:
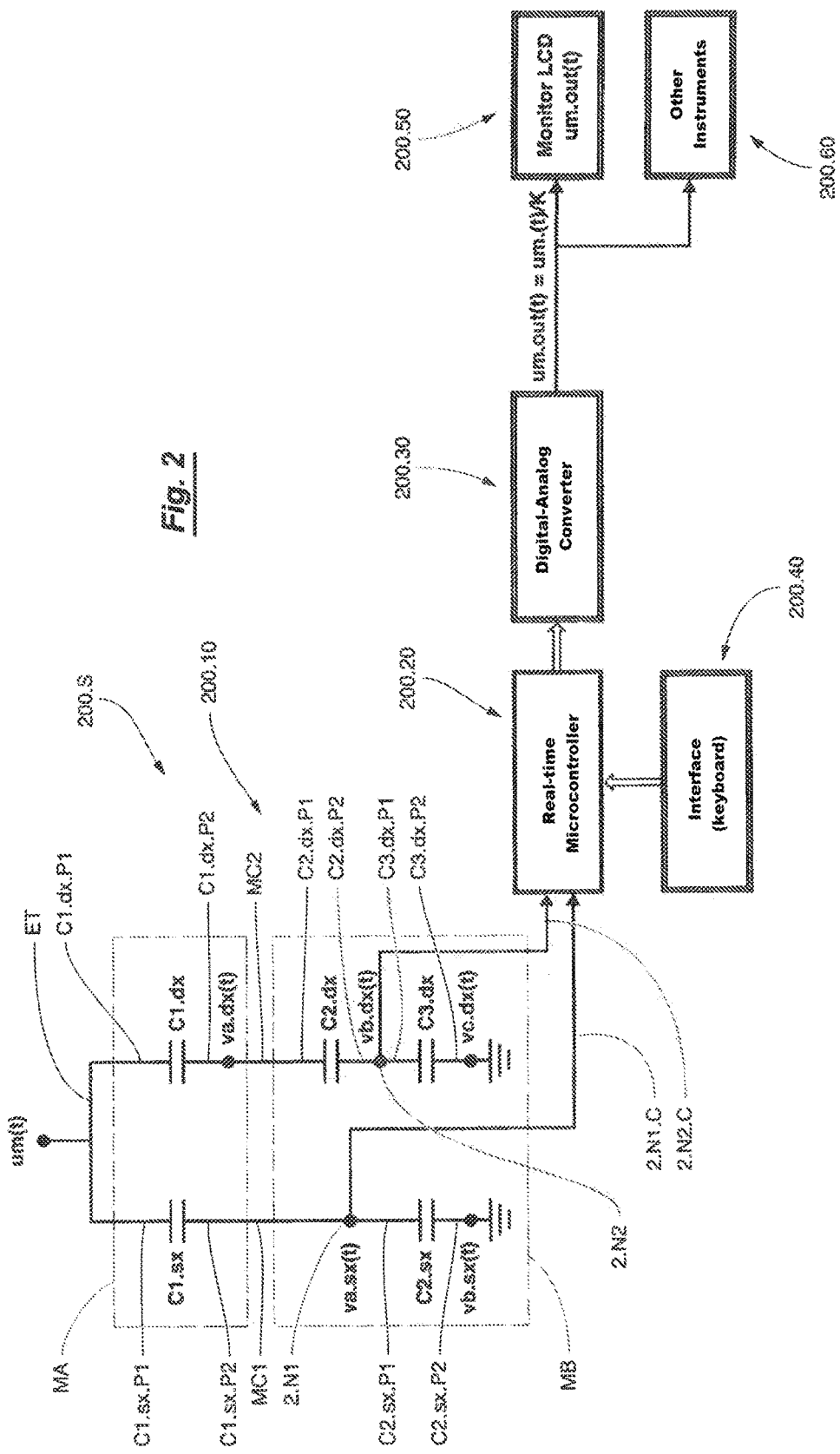
FIG. 2 schematically illustrates a second embodiment of the method object of the present invention.

With reference to FIGS. 1 and 2, the method object of the present invention for estimating the value of the electric voltage relating to a live element ET uses: a first capacitor C1.sx comprising a respective first pole C1.sx.p1 and a second pole C1.Sx.p2; a second capacitor C1.dx comprising a respective first pole C1.dx.p1 and a second pole C1.dx.p2; a third capacitor C2.sx comprising a respective first pole C2.sx.p1 and a second pole C2.sx.p2; a fourth capacitor C2.dx comprising a respective first pole C2.dx.p1 and a second pole C2.dx.p2; a fifth capacitor C3.dx comprising a respective first pole C3.dx.p1 and a second pole C3.dx.p2.

More particularly, in said method, the first capacitor C1.sx has its first pole C1.sx.p1 connected to said live element ET; the second capacitor C1.dx has its first pole C1.dx.p1 connected to said live element ET; the third capacitor C2.sx has its first pole C2.sx.p1 connected to the second pole C1.sx.p2 of the first capacitor C1.sx preferably by means of a respective connecting conductor MC1 and its second pole C2.sx.p2 connected to the ground; the fourth capacitor C2.dx has its first pole C2.dx.p1 connected to the second pole C1.dx.p2 of the second capacitor C1.dx preferably by means of a respective connecting conductor MC2 and its second pole C2.dx.p2 connected to the first pole C3.dx.p1 of the fifth capacitor C3.dx; the fifth capacitor C3.dx has its second pole C3.dx.p2 connected to ground.

With reference to the connections described above, again schematically: the first capacitor C1.sx supplies a voltage value, va.sx(t), defined here as the first voltage value, on its second pole C1.sx.p2 and/or along the respective conducting wire C1.sx.p2_MC1_C2.sx.p1 which connects the first capacitor C1.sx to the third capacitor C2.sx, as for example on a first node indicated with 1.N1 in FIG. 1 and with 2.N1 in FIG. 2, the second capacitor C1.dx supplies a voltage value. va.dx(t), defined here as the second voltage value, on its the second pole C1.dx.p2 and/or along the respective conducting wire C1.dx.p2_MC2_C2.dx.p1 which connects the second capacitor C1.dx to the fourth capacitor C2.dx; the third capacitor C2.sx supplies a voltage value, vb.sx(t), defined here as third voltage value, on its second pole C2.sx.p2 and/or along the respective conducting wire which connects it to the ground, the fourth capacitor C2.dx supplies a voltage value, vb.dx(t), defined here as the fourth voltage value, on its second pole C2.dx.p2 and/or along the respective conducting wire C2.dx.p2_C3.dx.p1 which connects it to the fifth capacitor C3.dx, as for example on a second node, indicated by 1.N2 in FIG. 1 and indicated by 2.N2 in FIG. 2; the fifth capacitor C3.dx supplies a voltage value, vc.dx (t), defined here as the fifth voltage value, on its second pole C3.dx.p2 and/or along the conducting wire which connects it to the ground.

With reference to FIGS. 1 and 2, the components and connections indicated above, comprising the first capacitor C1.sx, the second capacitor C1.dx, the third capacitor C2.sx, the fourth capacitor C2.dx, and the fifth capacitor C3.dx, or a first module MA and a second module MB as understandable below, configure a schematic electric circuit indicated by 100.10 in FIG. 1 and by 200.10 in FIG. 2.

Always preferably, this method comprises the characteristic of subjecting the first capacitor C1.sx and the second capacitor C1.dx to the same operating and/or exercise and/or environmental and/or aging conditions (to the same vicissitudes), after their installation, i.e. in the subsequent passage of time, such as, for example, providing these two capacitors C1.sx and C1.dx connected and/or assembled and/or positioned and/or placed and/or arranged in such a way as to implement one or more of these features.

By way of non-limiting example, these two capacitors C1.sx and C1.dx could be connected to the live element ET and/or arranged close to each other and/or positioned into the same module, e.g. module MA, in such a way that they will both be subjected, over the course of time, to the same vicissitudes mentioned above.

With reference to FIGS. 1 and 2, the method object of the present invention preferably provides to use of a first electric module MA, a second electric module MB, and connection means MC1 and MC2 to connect two modules MA and MB together.

In this context, this method provides for having in the first module, MA, at least the first capacitor C1.sx and the second capacitor C1.dx and, consequently, for having, in the second electric module, MB, at least the third capacitor C2.sx, the fourth capacitor C2.dx and the fifth capacitor C3.dx, as well as to connect said two modules MA and MB to each other, for example by means of connection means MC1 and MC2, wherein the first connection means MC1 provides for connect the second pole C1.sx.p2 of the first capacitor C1.sx with the first pole C2.sx.p1 of said third capacitor C2.sx, and in which the second connection means MC2 connects the second pole C1.dx.p2 of the second capacitor C1.dx with the first pole C2.dx.p1 of the fourth capacitor C2.dx. The second module MB can be positioned separately from said first module MA, such as, for example, in a sheltered and easily accessible place, preferably inside an electrical substation.

With reference to FIG. 1, always preferably, the method object of the present invention can further use the following components: a first AC/RMS value converter 100.20 connected via a respective conductor 1.N2.C to the second node 1.N2 positioned along the conductor connection between the fourth capacitor C2.dx and the fifth capacitor C3.dx; a second AC/RMS converter 100.30 connected by means of a respective conductor 1.N1.C to the first node 1.N1 positioned along the connecting conductor between the first capacitor C1.sx and the third capacitor C2.sx; a microcontroller 100.40 connected to said first and second converters 100.20 and 100.30; a user interface (keyboard) 100.50 for data entry, such as for example entry of capacitor capacitance values, connected to said microcontroller 100.50; a display 100.60 connected to the microcontroller 100.4.

Again with reference to FIG. 1, said last components, 100.20, 100.30, 100.40, 100.50, 100.60, in association with the components of the circuit 100.10, i.e. with the components C1.sx, C1.dx, C2.sx, C2.dx, C3.dx, form a system indicated by 100.S in FIG. 1, which can optionally comprise the connection means MC1 and MC2.

With reference to FIG. 2, always preferably, the method object of the present invention can further use the following components: a Real-Time Microcontroller 200.20 connected by a respective conductor 2.N2.C to the second node 2.N2 positioned along the connection conductor between the fourth capacitor C2.dx and the fifth capacitor C3.dx and connected by means of a conductor 2.N1.C to the first node 2.N1 positioned along the connecting conductor between the first capacitor C1.sx and the third capacitor C2.sx; a Digital-Analog Converter 200.30 connected to the Real_time Microcontroller 200.20; a user interface (keyboard) 200.40 for entering data, such as for example for entering the transformation ratio "k", connected to the Real_Time Microcontroller 200.20, an LCD monitor 200.50; other instruments 200.60.

Again with reference to FIG. 2, said last components, 200.20, 200.30, 200.40, 200.50, 200.60, in association with the components of the circuit 200.10, i.e. with the components C1.sx, C1.dx, C2.sx, C2.dx, C3.dx, form a system indicated by 200.S in FIG. 2, which can optionally comprise the connection means MC1 and MC2.

According to a preferred embodiment of the method object of the present invention, it preferably envisages using as first capacitor C1.sx and as second capacitor C1.dx two equal and/or identical capacitors.

According to a further embodiment of the method object of the present invention, it can use as first capacitor C1.sx and second capacitor C1.dx two capacitors having a respective dielectric identical to each other.

As an alternative, these two capacitors C1.sx and C1.dx can have a respective dielectric that is not identical (i.e. different) to each other, but, in any case, two respective dielectrics that are not identical to each other whose characteristics change identically if subjected, over time, to the same functional and/or environmental vicissitudes (operation, temperature, humidity, etc.) and/or aging.

According to a further embodiment of the method object of the present invention, it provides to use as fourth capacitor C2.dx of a capacitor having a capacitance value having the same order of magnitude with respect to the first capacitor C1.sx and/or with respect to the second capacitor C1.dx.

Furthermore, as a variant of implementation of the method object of the present invention, it can use as first capacitor C1.sx and as second capacitor C1.dx two capacitors which could be two capacitors (two capacities) with a known relationship between them, i.e. two capacitors C1.sx and C1.dx which have a respective capacitance value, Vdc_C1.sx and Vdc_C1.dx, where these two values have a ratio, . . . , C1.sx/C1.dx=Known_r_value . . . , to then consider said known_r_Value in the equation/calculation for the estimation of the voltage relating to the element under voltage ET.

With reference to the method object of the present invention, the estimate of the voltage value of the element under tension ET can be calculated by means of various methods/equations preferably using the following values: 1)_at least one voltage value detected and pertaining to a first point/node 1.N1/2.N1 positioned along the wire C1.sx.P2_MC1_C2.sx.p1 which connects the first capacitor C1.sx to the third capacitor C2.sx; 2)_at least one voltage value detected and relating to a second point/node 1.N2/2.N2 positioned along the conducting wire C2.dx.p2_C3.dx.p1 which connects the fourth capacitor C2.dx to the fifth capacitor C3.dx: 3)_at least one capacitance value of the third capacitor C2.sx; 4)_at least one capacitance value of the fourth capacitor C2.dx; 5)_at least one capacitance value of the fifth capacitor C3.dx.

According to a first exemplary embodiment of the method object of the present invention, see FIG. 1, system 100.S, the voltage value of the element ET is calculated using the following equation (equation_1):

$$\ldots um = \frac{Va.sx.Vb.dx.(C2.sx.C3.dx + C2.dx - C2.dx.C3.dx)}{C2.dx.(Va.sx.C2.sx - Vb.dx.C3.dx)}$$

where
- Um=RMS value of the voltage relating to said element under voltage ET
- Va.sx=Effective value of the voltage relating to the second pole C1.sx.p2 of the first capacitor C1.sx and/or relating to a first node 1.N1 positioned along the conducting wire C1.sx.P2_MC1_C2.sx.p1 which connects the first capacitor C1.sx to third capacitor C2.sx:
- Vb.dx=Effective value of the voltage relating to the second pole C2.dx.p2 of the fourth capacitor C2.dx and/or relating to a second node 1.N2 positioned along the conducting wire C2.dx.p2_C3.dx.p1 which connects the fourth capacitor C2.dx to fifth capacitor C3.dx;
- C2.sx=Capacitance value of the third capacitor C2.sx;
- C2.dx=Capacitance value of the fourth capacitor C2.dx;
- C3.dx=Capacitance value of the fifth capacitor C3.dx According to a second exemplary embodiment of the method object of the present invention, see FIG. 2, system 200.S, the voltage value of the ET element is calculated using the following equation (equation_2):

$$um(t) = \frac{va.sx(t).vb.dx(t).(C2.sx.C3.dx + C2sx.C2.dx - C2.dx.C3.dx)}{C2.dx.(va.sx(t).C2.sx - vb.dx(t).C3.dx)}$$

where
- um(t)=Estimated value of the instantaneous primary voltage relating to said element under voltage ET;
- va.sx(t)=Value of the instantaneous voltage relating to the second pole C1.sx.p2 of the first capacitor C1.sx and/or relating to a first node 2.N1 positioned along the conducting wire C1.sx.P2_MC1_C2.sx.p1 which connects the first capacitor C1.sx to the third capacitor C2.sx;
- vb.dx(t)=Value of the instantaneous voltage relating to the second pole C2.dx.p2 of the fourth capacitor C2.dx) and/or relating to a second node 2.N2 positioned along the conducting wire C2.dx.p2_C3.dx.p1 which connects the fourth capacitor C2.dx to the fifth capacitor C3.dx;
- C2.sx=Capacitance value of the third capacitor C2.sx;
- C3.dx=Capacitance value of the fifth capacitor C3.dx
- C2.dx=Capacitance value of the fourth capacitor C2.dx.

With reference to the description given above and to the attached figures, by way of non-limiting order, preferably, the method object of the present invention provided for the use of: 1)_at least one voltage value, defined as va.sx(t), detected for example by means of a first point/node 1.N1/2.N1 positioned along the wire C1.sx.P2_MC1_C2.sx.p1 which connects the first capacitor C1.sx to the third capacitor C2.sx; 2)_at least one voltage value, defined as vb.dx. (t), detected for example by a second point/node 1.N2/2.N2 positioned along the conducting wire C2.dx.p2_C3.dx.p1 which connects the fourth capacitor C2.dx to the fifth capacitor C3.dx, and conditioning and/or processing these two detected signals/values, va.sx(t) and vb.dx(t), in association with other values if required, as described above, in order to estimate the voltage value of the element in tension ET.

Components

With reference to the first and second embodiments, 100.S/200.S, illustrated in the respective FIGS. 1 and 2, as an exemplifying but non-limiting embodiment, the System described above could comprise: as first capacitor C1.sx, a capacitor manufactured by Vishay company, product no. 715C30KTT33, having the following characteristics: ceramic capacitor, capacity: 330 pF, ac rated voltage: 20 KV: as second capacitor C1.dx, a capacitor manufactured by Vishay company, product no. 715C30KTT33 having the following characteristics: ceramic capacitor, capacity: 330 pF, ac rated voltage: 20 kV: as third capacitor C2.sx, a capacitor manufactured by Kemet company, product no. Type C1002_X7R, having the following characteristics: ceramic capacitor, capacity: 590 nF, rated voltage 100V, NP0; as fourth capacitor C2.dx, a capacitor manufactured by the Kemet company, product no. Type C1002_X7R, having the following characteristics: ceramic capacitor, capacitance: 20 pF, rated voltage: 50V, NP0; as fifth capacitor C3.dx, a capacitor manufactured by Kemet company, product no. C1812C683J1GACAUTO, having the following characteristics: ceramic capacitor, capacity: 630 nF, rated voltage: 100V. NP0, ceramic.

In this context, it is specified that the devices C1.sx, C1.dx, C2.sx. C2.dx and C3.dx specified above, by way of example, can also assume other embodiments, suitable for performing the same function, without departing from the inventive concepts protected by the present invention.

With particular reference to the first embodiment, illustrated in FIG. 1, system 100.S, as an exemplifying but non-limiting embodiment, the system described above could comprise: as the first ac/rms value converter 100.20, a device capable of converting an alternating voltage waveform into a direct voltage, i.e. capable of calculating (converting) the effective value of an alternating quantity which reaches the input of said first converter device 100.20, such as for example a commercial converter device known as model AD736 produced by the company Analog Devices; as second ac/rms converter 100.30, an identical and/or analogous converter device with respect to the previous first converter 100.20; as microcontroller 100.40, a device suitable for calculating mathematical formulas, in which said microcontroller 100.40 is always preferably provided with an analog-digital converter for acquiring instantaneous signals, converting them into digital numbers, performing the operations and, therefore, communicating the results to an external display, such as for example a commercial microcontroller known as model PIC24FJ128GC006 manufactured by Microchip Technologies Inc.; as display 100.50, a device for presenting information, preferably a liquid crystal display of the 4-line type with 20 characters per line, such as for example a commercial display LCD-20×4Y produced by the company Gravitech; as a user interface (keyboard) 100.60, a keyboard or other similar device capable of allowing data and/or commands to be entered into the aforementioned Microcontroller 100.40.

In this context, it is specified that the devices 100.20, 100.30, 100.40, 100.50 and 100.60, specified above by way of example, can also assume other embodiments, capable of performing the same functions, without departing from the inventive concepts protected by the present invention.

With particular reference to the second embodiment, illustrated in FIG. 2, as an exemplifying but non-limiting embodiment, the system described above could comprise: as a Real-Time Microcontroller 200.20, a device suitable for calculating formulas and modifying of signals acquired with an internal analog-digital converter, also having characteristics that allow it to operate with real-time operating systems, such as for example a Real-Time microcontroller known as model DSPIC33FJ16GS402_H/MM produced by Microchip Technologies Inc.; as Digital-Analog Converter 200.30, a Digital-Analog converter device suitable for converting a series of data in digital format into an instantaneous-analog signal, such as for example a commercial Digital-Analog Converter known as model DAC121S101CIMM/NOPB manufactured by the company Texas Instruments; as user interface (keyboard) 200.40, a keyboard or other similar device able to allow data and/or commands to be entered into the aforementioned microcontroller 200.20.

In this context, it is specified that the devices 200.20, 200.30, 200.40, specified above by way of example, can also assume other embodiments, suitable for performing the same functions, without departing from the inventive concepts protected by the present invention.

First Example of System Calculation—Method with System 100.S of FIG. 1

By way of example, with reference to the system 100. S of FIG. 1, using the components as indicated above and substantially
a first capacitor C1.sx having capacity: 330 pF;
a second capacitor C1.dx having capacity: 330 pF;
a third capacitor C2.sx having a capacity of 590 nF;
a fourth capacitor C2.dx having capacity: 20 pF;
a fifth capacitor C3.dx having capacity: 630 nF.
by applying the 100.S system to an element having voltage, the following values were detected
at the output of the second converter 100.30 a Va.sx value=0.25312 V
at the output of the first converter 100.20 a value Vb.dx=0.13554 V
and, on the basis of the aforementioned equation, i.e. (equation_1):

$$um = \frac{Va.sx.Vb.dx.(C2.sx.C3.dx + C2.sx.C2.dx - C2.dx.C3.dx)}{C2.dx.(Va.sx.C2.sx - Vb.dx.C3.dx)}$$

we will have as a calculation performed by the Microcontroller 100.40

$$... Um = 0.25312V.0.13554V.(590nF.630nF + 590nF.20pF - 20pF.630nF)/$$
$$(20pF.(0.25312\ V.590nF - 0.13554V.630nF))$$

whose result corresponds to
Um=9.970.2V

Second Calculation Example_Method with System 200.S of FIG. 2

Figure 4:
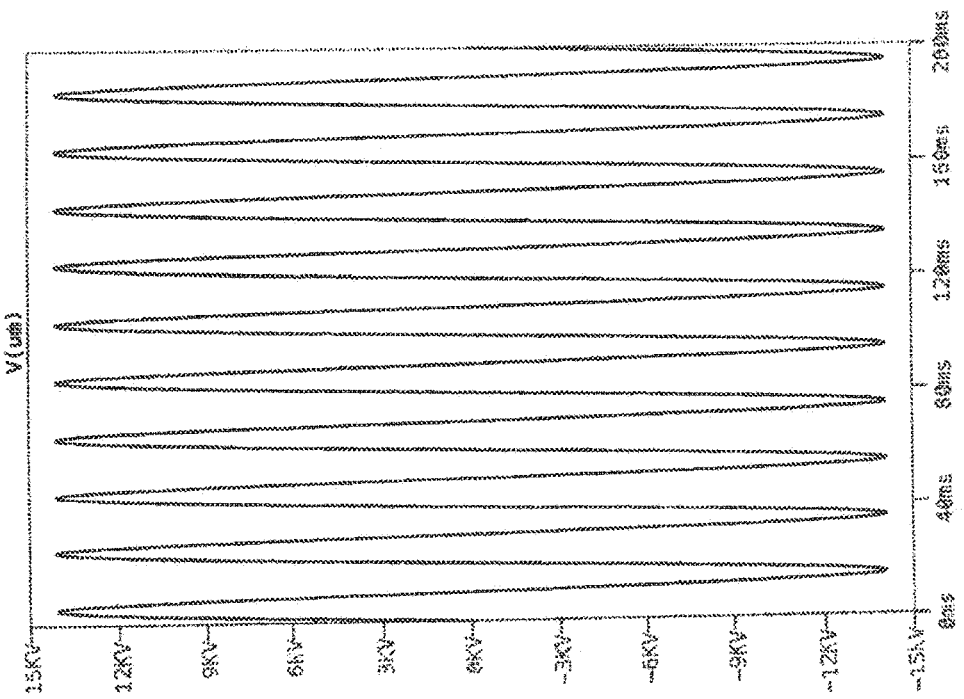
FIGS. 3 and 4 illustrate waveforms of electrical voltage.
Figure 3:
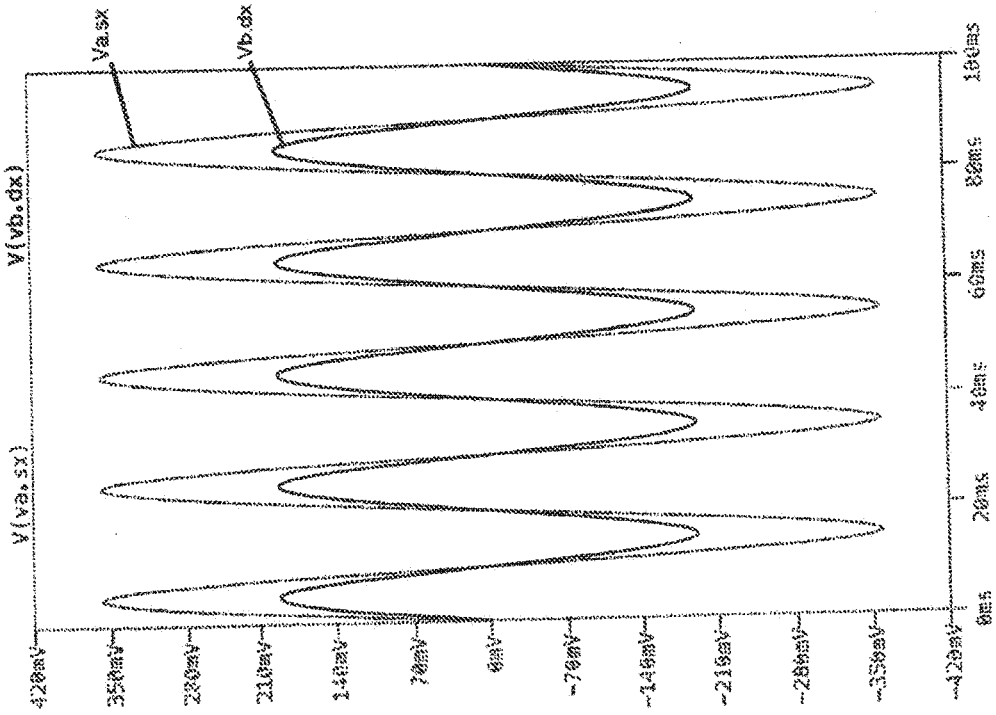

Again by way of example, with reference to the system 200.S of FIG. 2, using the components as indicated above, by applying the system 200.S to an element ET having voltage, the waveforms illustrated in FIG. 3 were detected. _The Real Time micro-controller divides the instantaneous voltages va.sx(t) and vb.dx(t) by the transformation ratio k, previously entered using the keyboard 200.40 or other system and using the equation (equation_2):

$$um(t) = va.sx(t).vb.dx(t).(C2.sx.C3.dx + C2sx.C2.dx - C2.dx.C3.dx)/$$
$$C2.dx.(va.sx(t).C2.sx - vb.dx(t).C3.dx)$$

was obtained as a result of the waveform waveform illustrated in FIG. 4.

By means of the method object of the present invention, a correct and/or safe estimate of the voltage value of the live element is maintained over time, simple and inexpensive maintenance can be performed since the module MA does not require maintenance and the module MB can be positioned in an easily accessible place (such as for example inside an electrical substation) and, therefore, the maintenance and/or repair of said systems, for example in relation to the Module MB, can be performed even if the element ET subject to the measurement is live (for example by equipping the connection means MC1 and MC2 with disconnectors). _Furthermore, the repair and maintenance operations can be carried out, as for example the repair of the Module MB, can be executed even through non-skilled workers.

With reference to the above description, the term "module" MA is preferably used to define an independent unit of a complex comprising, for example, two or more modules MA and MB that can be connected together and/or two or more constructively independent units MA and MB connectable each other for example by means of conductors and/or an independent unit MA and other components connectable to said unit MA by means of conductors such as, for example > _MA + MB + 100.20 + 100.30 + 100.40 + 100.50 + 100.60 (FIG. 1)
> _MA + MB + 200.20 + 200.30 + 200.40 + 200.50 + 200.60 (FIG. 2)

Again preferably, said module MA comprises specific and particular components as above described and, furthermore, said module MA is intended to perform a particular and specific function as part of an apparatus and/or a circuit and/or a complex and/or a system.

Again preferably, said module MA is made as an autonomous self-supporting unit, so that it can be easily removed and/or replaced and/or disconnected with respect to the respective apparatus and/or circuit and/or complex and/or system and, if desirable, said module MA can also provide a shield to protect the related components from the surrounding electric fields.

The description of the method indicated above is given purely by way of non-limiting example and, therefore, it is evident that all those modifications or variations suggested by practice and by its use can be made to said method and, in any case, within the scope of scope of the following claims, which also form an integrative part for the present description.

The invention claimed is:

1. A method of estimating an voltage value of a live element at a predetermined instant in time in a system having:
a first capacitor having a first pole and a second pole;
a second capacitor having a first pole and a second pole;
a third capacitor having a first pole and a second pole;
a fourth capacitor having a first pole and a second pole;
a fifth capacitor having a first pole and a second pole, the first pole of the first capacitor being connected to the live element the first pole of the second capacitor being connected to the live element, the first pole of the third capacitor being connected to the second pole of the first capacitor and the second pole of the third capacitor being connected to ground, the first pole of the fourth capacitor being connected to the second pole of the second capacitor and the second pole of the fourth capacitor being connected to the first pole of the fifth capacitor the second pole of the fifth capacitor being connected to ground, the first capacitor providing on its second pole and/or along a conductor connecting the first capacitor with the third capacitor a value of electric voltage constituting a first value of electric voltage, the fourth capacitor providing on its second pole and/or along a conductor connecting the fourth capacitor with the fifth capacitor a value of electric voltage constituting a fourth value of electric voltage, the method of estimating the value of electric voltage of the live element comprising the following steps:
A) detecting in the predetermined instant a value of the electric voltage at a first point/node along the conductor that connects the first capacitor to the third capacitor;
B) detecting in the predetermined instant a value of the electric voltage at a second point/node along the conductor that connects the fourth capacitor to the fifth capacitor; and
C) performing the estimate using the following values:
1) The value of the voltage at the first point/node detected by step A);
2) The value of the voltage at the second point/node detected by step B);
3) The capacitance of the third capacitor;
4) The capacitance of the fourth capacitor; and
5) The capacitance of the fifth capacitor.

2. The method according to claim 1, wherein the first capacitor and the second capacitor are of the same capacitance and/or are constructed such that, when subjected to the same environments, they change capacitance identically.

3. The method according to claim 1, wherein the first capacitor and the second capacitor have respective dielectric materials which are identical to each other and/or have respective dielectric materials that are not identical to each other but whose characteristics change and/or mutate identically if the two capacitors are subjected, over time, to the same operating conditions.

4. The method according to claim 1, wherein the fourth capacitor has an electric capacity value equal to that of the first capacitor and/or the second capacitor.

5. The method according to claim 1, wherein the first capacitor and the second capacitor have respective capacitances forming a predetermined ratio.

6. The method according to claim 1, further comprising the step of:
subjecting during the passage of time the first capacitor and the second capacitor to the same operating and/or environmental and/or aging conditions.

7. The method according to claim 1, wherein the system further comprises:
a first AC/RMS converter connected by a respective conductor to a second node along the conductor between the fourth capacitor and the fifth capacitor;
a second AC/RMS converter connected by a respective conductor to a first node along the conductor between the first capacitor and the third capacitor; a microcontroller connected to the first and second converter.

8. The method according to claim 1, wherein the value of the electrical voltage of the live element is calculated using the following equation:

$$Um = \frac{Va.sx.Vb.dx.(C2.sx.C3.dx + C2.sx.C2.dx - C2.dx.C3.dx}{C2.dx.(Va.sx.C2.sx - Vb.dx.C3.dx)}$$

where
Um=effective value of the voltage of the live element ET;
Va.sx=effective value of the voltage at the second pole C1.sx.p2 of the first capacitor C1.sx and/or at a first node 1.N1 positioned along the conductor C1.sx.p2_MC1_C2.sx.p1 which connects the first capacitor C1.sx to the third capacitor C2.sx;
Vb.dx=effective value of the voltage at the second pole C2.dx.p2 of the fourth capacitor C2.dx and/or at a second node 1.N2 positioned along the conductor C2.dx.p2_C3.dx.p1 connecting the fourth capacitor C2.dx to the fifth capacitor C3.dx;
C2.sx=the capacitance of the third capacitor C2.sx;
C2.dx=the capacitance of the fourth capacitor C2.dx; and
C3.dx=the capacitance of the fifth capacitor C3.dx.

9. The method according to claim 1, wherein the system further comprises:
a Microcontroller Real-Time connected by a respective conductor to a second node positioned along the conductor between the fourth capacitor and the fifth capacitor and connected by a conductor to a first node positioned along the conductor that connect the first capacitor with the third capacitor;
a Digital-Analog Converter connected to the microcontroller.

10. The method according to claim 1, wherein the value of the electrical voltage of the live element is calculated using the following equation:

$$um(t) = \frac{va.sx(t) \cdot vb.dx(t) \cdot (C2.sx \cdot C3.dx + C2.sx \cdot C2.dx - C2.dx \cdot C3.dx)}{C2.dx \cdot (va.sx(t) \cdot C2.sx - vb.dx(t) \cdot C3.dx)}$$

where um (t)=Estimated value of the instantaneous primary voltage relating to said element under voltage ET;

va.sx=Value of the instantaneous electric voltage of the second pole of the first capacitor and/or of a first node positioned along the conductor which connects the first capacitor to the third capacitor;

vb.dx(t)=Value of the instantaneous electric voltage of the second pole of the fourth capacitor and/or of the a second node positioned along the conductor that connects the fourth capacitor with the fifth capacitor C3.dx;

C2.sx=the capacitance of the third capacitor C2.sx;

C3.dx=the capacitance of the fifth capacitor C3.dx; and

C2.dx=the capacitance of the fourth capacitor C2.dx.

11. The method according to claim 1, wherein the system comprises at least a first module and a second module.

12. The method according to claim 1, wherein the system comprises a first module that includes at least the first capacitor and the second capacitor.

* * * * *